United States Patent
Tang

(10) Patent No.: US 11,142,367 B2
(45) Date of Patent: Oct. 12, 2021

(54) BASKET STRUCTURE

(71) Applicant: Malzine Co., Ltd., Changhua Hsien (TW)

(72) Inventor: Pao-Hsun Tang, Changhua Hsien (TW)

(*) Notice: Subject to any disclaimer, the term of this patent is extended or adjusted under 35 U.S.C. 154(b) by 301 days.

(21) Appl. No.: 15/690,354

(22) Filed: Aug. 30, 2017

(65) Prior Publication Data

US 2018/0208355 A1 Jul. 26, 2018

(30) Foreign Application Priority Data

Jan. 26, 2017 (TW) ................... 106201603

(51) Int. Cl.
*B65D 6/08* (2006.01)
*B65D 6/02* (2006.01)
*B65D 6/34* (2006.01)
*B62B 3/00* (2006.01)

(52) U.S. Cl.
CPC ............... *B65D 7/14* (2013.01); *B62B 3/005* (2013.01); *B65D 7/06* (2013.01); *B65D 7/44* (2013.01); *B62B 3/002* (2013.01)

(58) Field of Classification Search
CPC ... B65D 7/14; B65D 7/06; B65D 7/44; B65D 2501/24133; B65D 7/20; B65D 11/14; B65D 7/17; B62B 3/002
USPC ..... 220/4.01, 485, 489, 493, 494, 729, 4.28, 220/4.31, 600, 601, 607, 610, 611, 625, 220/660, 668, 682, 571; 248/94; 211/153, 134
See application file for complete search history.

(56) References Cited

U.S. PATENT DOCUMENTS

| | | | | | |
|---|---|---|---|---|---|
| 1,772,313 | A | * | 8/1930 | Hoffman | H02G 3/086 220/3.92 |
| 4,903,853 | A | * | 2/1990 | Lin | A45C 5/045 220/485 |
| D434,074 | S | * | 11/2000 | Hardy | D19/75 |
| 6,390,173 | B1 | * | 5/2002 | Story, Jr. | E06B 9/52 160/369 |
| 6,718,635 | B2 | * | 4/2004 | Cheng | A47B 55/02 220/485 |
| 7,228,985 | B2 | * | 6/2007 | Yeh | B62D 25/084 220/485 |
| 7,428,976 | B2 | * | 9/2008 | Cheng | A47B 55/02 220/485 |
| D669,540 | S | * | 10/2012 | Hu | D19/92 |
| D780,262 | S | * | 2/2017 | Tsai | D19/90 |
| D807,036 | S | * | 1/2018 | Hardy | D3/306 |

(Continued)

*Primary Examiner* — Steven A. Reynolds
*Assistant Examiner* — Javier A Pagan
(74) *Attorney, Agent, or Firm* — Che-Yang Chen; Law Office of Michael Chen

(57) ABSTRACT

A basket structure includes an outer frame and a net-shaped bottom plate secured on the outer frame. The outer frame has an upper end provided with a scratch-proof protrusion which is rounded outward. The outer frame has a lower end provided with a resting rib which is bent and extends inward. The net-shaped bottom plate is received in the outer frame and rests on the resting rib of the outer frame. Thus, the upper end of the outer frame is directly formed with the scratch-proof protrusion, and the lower end of the outer frame is directly formed with the resting rib whose sharp portion is bent inward, thereby preventing the basket structure from scratching the user.

10 Claims, 6 Drawing Sheets

(56) References Cited

U.S. PATENT DOCUMENTS

| | | | | |
|---|---|---|---|---|
| 2003/0102315 A1* | 6/2003 | Cheng | .................... | A47B 55/02 |
| | | | | 220/485 |
| 2005/0205578 A1* | 9/2005 | Yeh | ...................... | B62D 25/084 |
| | | | | 220/485 |
| 2009/0045201 A1* | 2/2009 | Cheng | .................... | A47B 55/02 |
| | | | | 220/494 |
| 2009/0184115 A1* | 7/2009 | Wang | ...................... | B65D 9/06 |
| | | | | 220/4.26 |
| 2012/0074148 A1* | 3/2012 | Stradt | .................. | A47K 3/281 |
| | | | | 220/483 |
| 2014/0001136 A1* | 1/2014 | Yeh | ........................ | A47B 47/00 |
| | | | | 211/186 |
| 2014/0175036 A1* | 6/2014 | Troyner | ............... | A47B 47/021 |
| | | | | 211/153 |
| 2015/0054237 A1* | 2/2015 | Peters | ...................... | B62B 3/14 |
| | | | | 280/33.997 |
| 2015/0327678 A1* | 11/2015 | Tang | ...................... | A47B 88/04 |
| | | | | 312/334.44 |
| 2016/0120313 A1* | 5/2016 | Tang | .................. | A47B 47/0091 |
| | | | | 211/134 |
| 2016/0144999 A1* | 5/2016 | Tang | ........................ | B65D 7/14 |
| | | | | 220/493 |
| 2016/0183682 A1* | 6/2016 | Tang | .................... | A47B 96/021 |
| | | | | 211/134 |
| 2016/0332770 A1* | 11/2016 | Tsai | ........................ | B65D 7/14 |
| 2018/0127143 A1* | 5/2018 | Yeh | ......................... | B65D 7/44 |
| 2018/0208354 A1* | 7/2018 | Yeh | ......................... | B65D 7/16 |

\* cited by examiner

BASKET STRUCTURE

BACKGROUND OF THE INVENTION

1. Field of the Invention

The present invention relates to a basket structure and, more particularly, to an improvement of a basket structure.

2. Description of the Related Art

A conventional basket structure comprises a sheet plate, made of steel, metallic net or plastic material, which is cut to form a bottom and four sides. The bottom and the four sides of the sheet plate are connected. Then, the sheet plate is bent to integrally form the conventional basket structure. However, the conventional basket structure includes sharp edges and sharp corners after the molding process, so that it is necessary to seal and cover the sharp edges and corners to prevent the user from being scratched or hurt by the sharp edges and corners. Thus, the conventional basket structure has complicated working procedures, thereby increasing the cost of fabrication.

BRIEF SUMMARY OF THE INVENTION

The primary objective of the present invention is to provide a basket structure that will not scratch the user to assure the safety of use.

In accordance with the present invention, there is provided a basket structure comprising an outer frame and a net-shaped bottom plate secured on a bottom of the outer frame. The outer frame has an upper end having a periphery provided with a scratch-proof protrusion which is rounded outward. The outer frame has a lower end having a periphery provided with a resting rib which is bent and extends inward. The lower end of the outer frame has a corner provided with a hollow opening. The net-shaped bottom plate is received in the outer frame and rests on the resting rib of the outer frame.

Preferably, the outer frame is provided with two opposite connecting brackets which are inverted L-shaped and protrude outward.

Preferably, the net-shaped bottom plate has a bottom provided with three reinforcing projections which are parallel with each other.

Preferably, the outer frame is formed by bending a steel plate and has at least four sides, and the bent steel plate has two distal ends connected together by soldering.

Alternatively, the outer frame includes two substantially U-shaped steel plates juxtaposed to each other and combined together by soldering.

According to the primary advantage of the present invention, the outer frame and the net-shaped bottom plate of the basket structure are made of different material. The outer frame is formed by bending a steel plate. Then, the upper end of the outer frame is bent and wound outward to form the scratch-proof protrusion. Then, the lower end of the outer frame is bent inward to form the resting rib. Then, the net-shaped bottom plate is inserted into the outer frame and rests on the resting rib of the outer frame. Finally, the net-shaped bottom plate is combined with the resting rib of the outer frame by soldering to construct the basket structure. Thus, the upper end of the outer frame is directly formed with the scratch-proof protrusion, and the lower end of the outer frame is directly formed with the resting rib whose sharp portion is bent inward, thereby preventing the basket structure from scratching the user. In addition, the basket structure has a simplified construction and assembly procedures, thereby decreasing the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
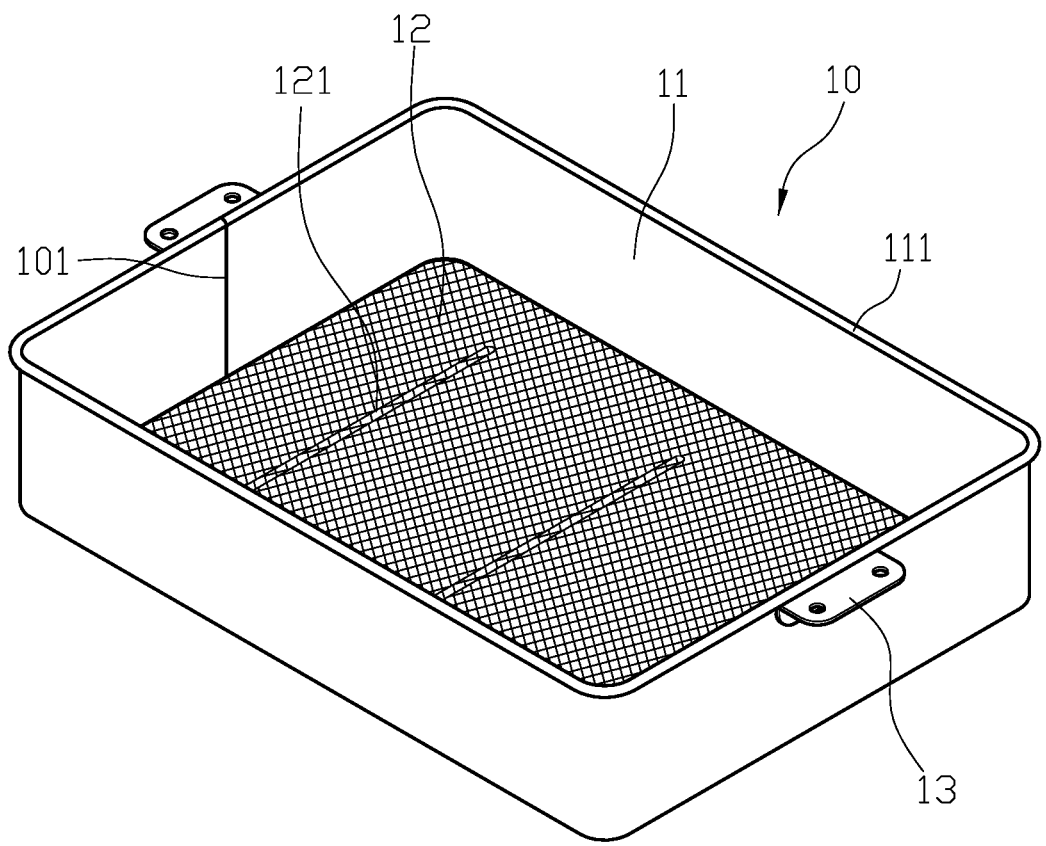
FIG. 1 is a perspective view of a basket structure in accordance with the first preferred embodiment of the present invention.
Figure 2:
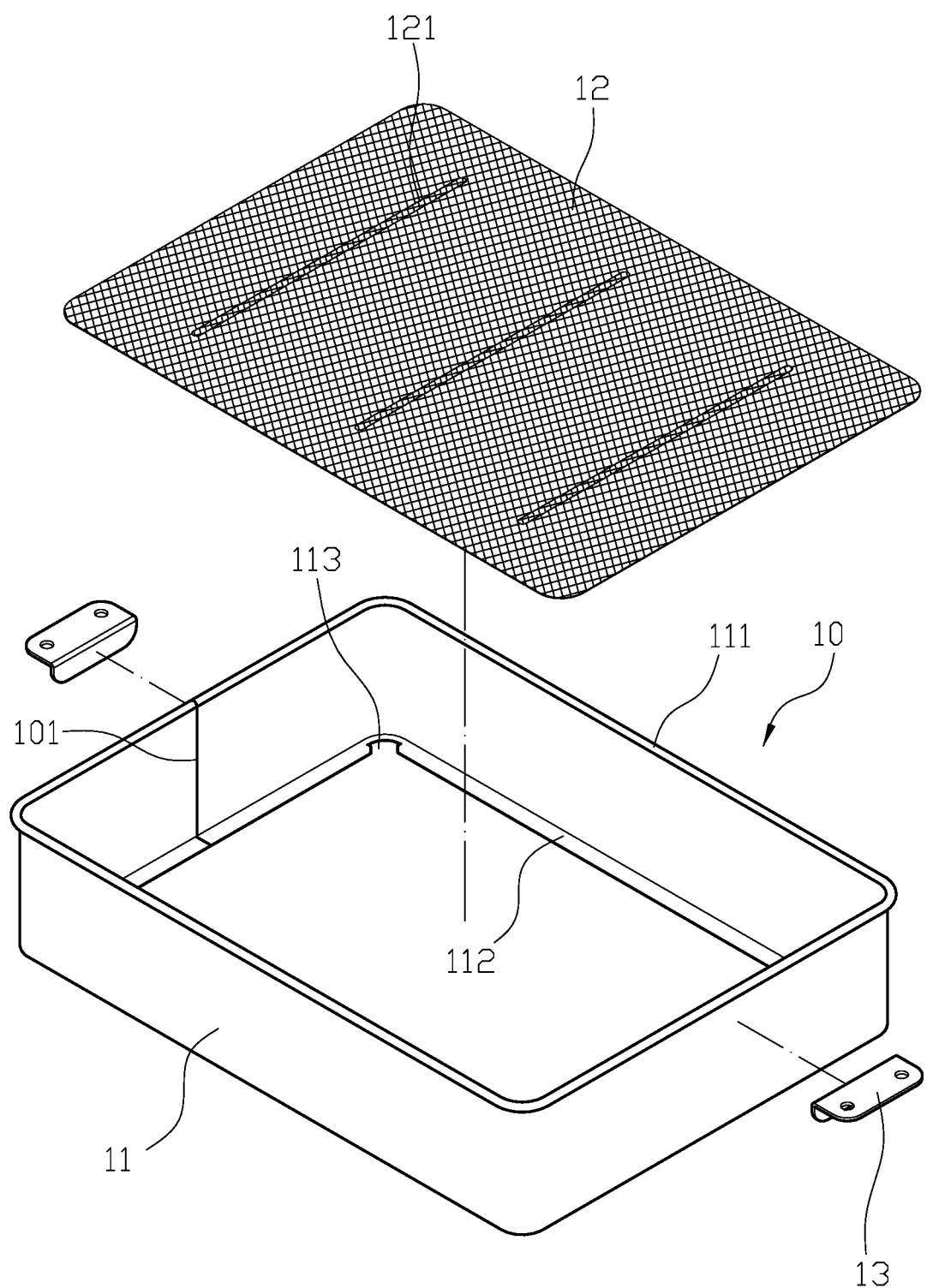
FIG. 2 is an exploded perspective view of the basket structure in accordance with the first preferred embodiment of the present invention.
Figure 3:
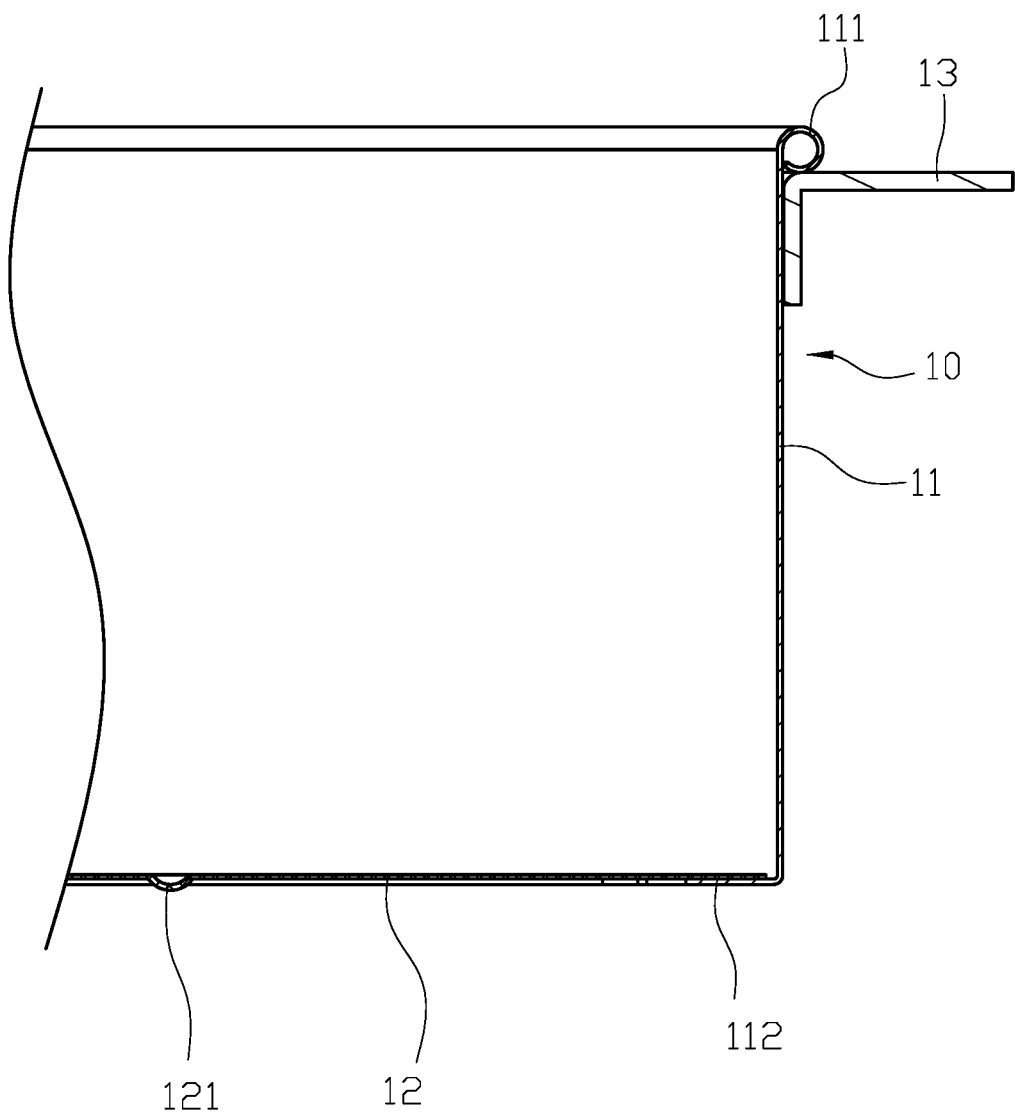
FIG. 3 is a partially planar cross-sectional assembly view of the basket structure in accordance with the first preferred embodiment of the present invention.

Referring to the drawings and initially to FIGS. 1-3, a basket structure 10 in accordance with the preferred embodiment of the present invention comprises an outer frame 11 and a net-shaped bottom plate 12 secured on a bottom of the outer frame 11.

The outer frame 11 is formed by bending a steel plate and has at least four sides. The bent steel plate has two distal ends connected together by soldering. The outer frame 11 has an upper end having a periphery provided with a scratch-proof protrusion 111 which is rounded outward. The outer frame 11 has a lower end having a periphery provided with a resting rib 112 which is bent and extends inward. The lower end of the outer frame 11 has a corner provided with a hollow opening 113. The outer frame 11 is provided with two opposite connecting brackets 13 which are inverted L-shaped and protrude outward. Preferably, the two connecting brackets 13 are located under the scratch-proof protrusion 111.

The net-shaped bottom plate 12 is received in the outer frame 11 and rests on and is supported by the resting rib 112 of the outer frame 11. The net-shaped bottom plate 12 has a bottom provided with three reinforcing projections 121 which are parallel with each other.

Figure 4:
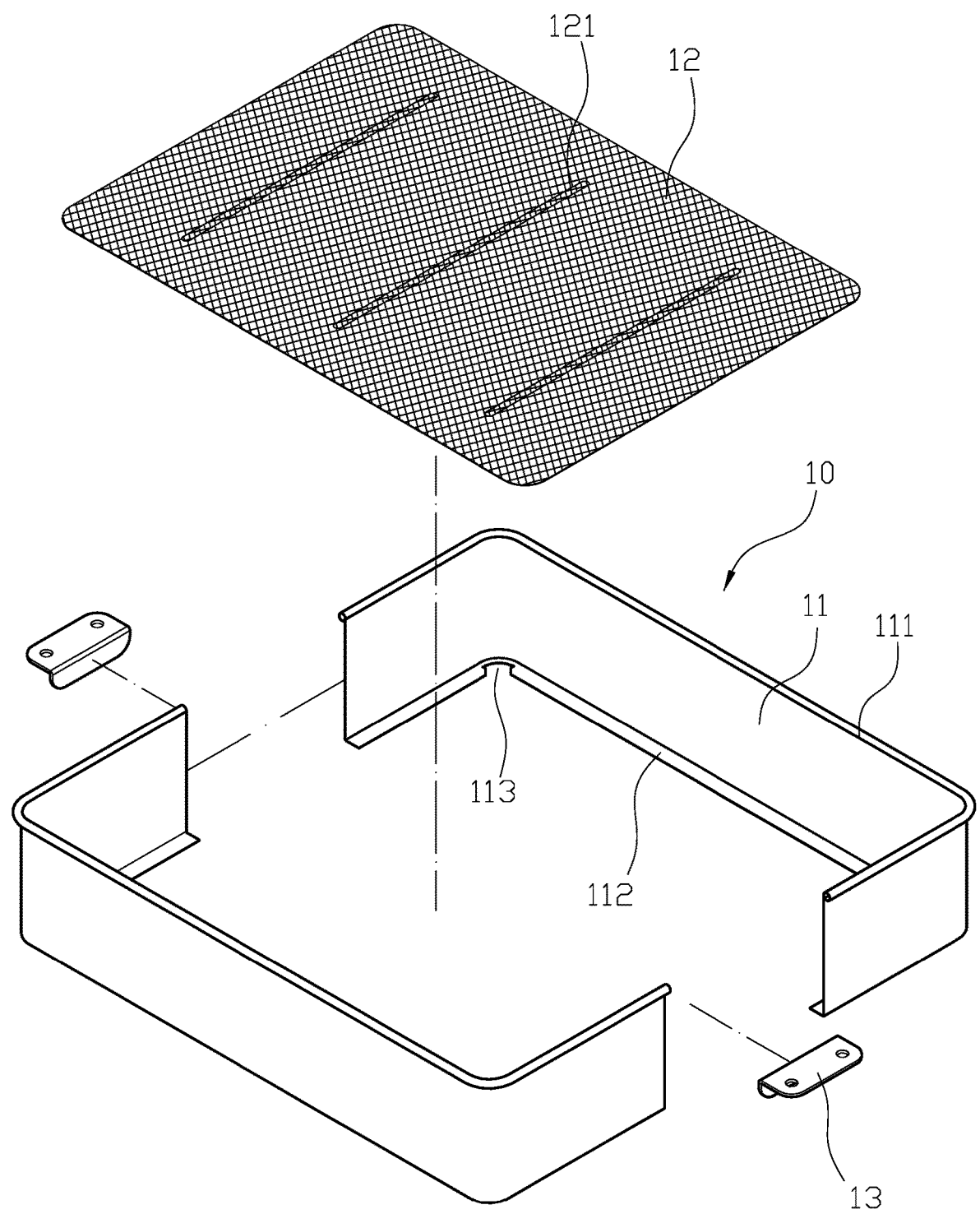
FIG. 4 is an exploded perspective view of a basket structure in accordance with the second preferred embodiment of the present invention.
Figure 5:
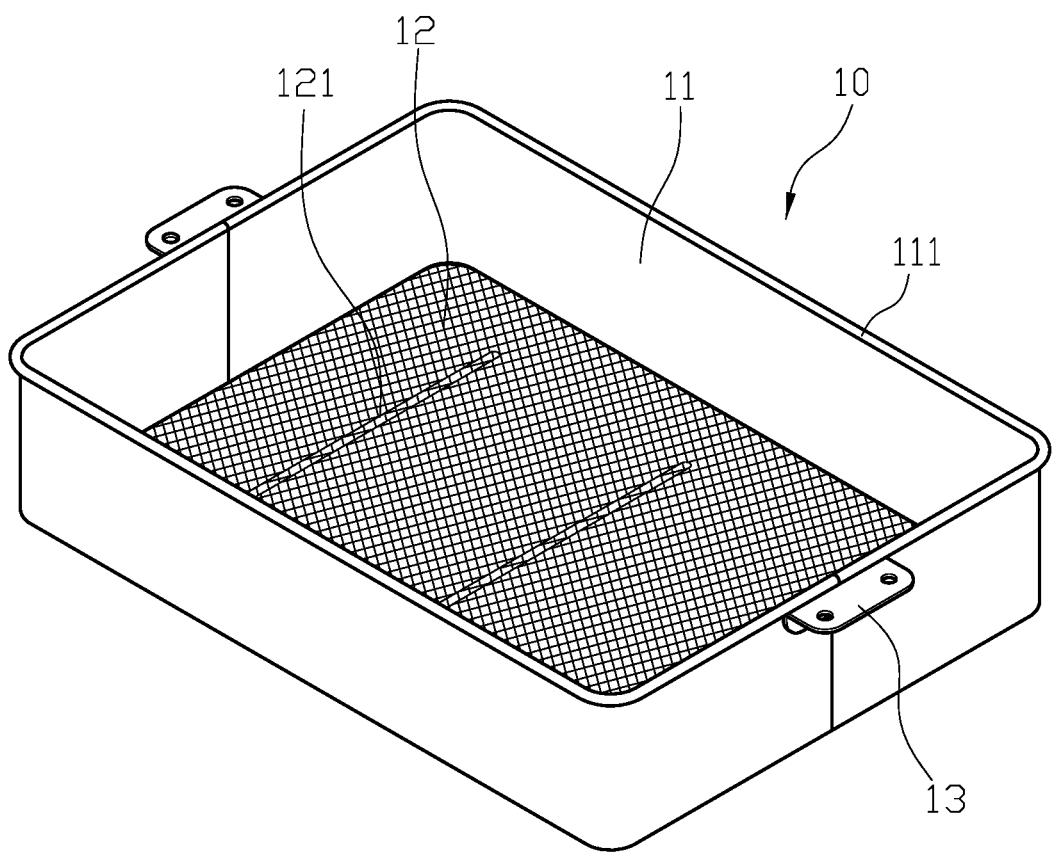
FIG. 5 is a perspective assembly view of the basket structure in accordance with the second preferred embodiment of the present invention.

Referring to FIGS. 4 and 5, the outer frame 11 includes two substantially U-shaped steel plates juxtaposed to each other and combined together by soldering.

Figure 6:
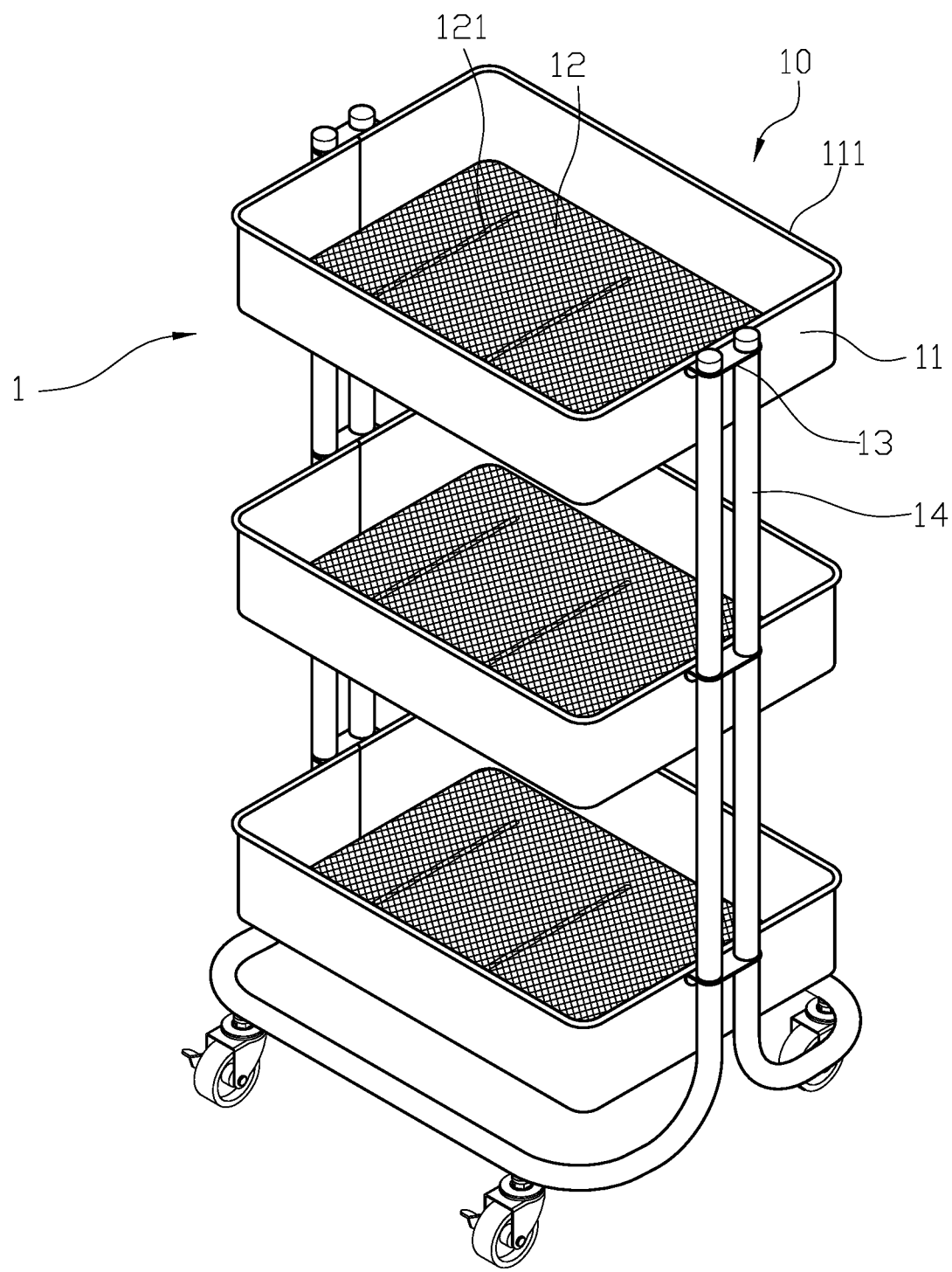
FIG. 6 is a perspective view showing combination of multiple basket structure.

In use, referring to FIG. 6 with reference to FIGS. 1-3, the basket structure 10 is used individually. Alternatively, multiple basket structures 10 are connected by a support rack unit 14 to construct a shelf 1. In assembly, the connecting brackets 13 of the basket structures 10 are connected with the support rack unit 14. Preferably, the shelf 1 is provided with multiple castors to facilitate movement of the shelf 1.

Accordingly, the outer frame 11 and the net-shaped bottom plate 12 of the basket structure 10 are made of different material. The outer frame 11 is formed by bending a steel plate. Then, the upper end of the outer frame 11 is bent and wound outward to form the scratch-proof protrusion 111. Then, the lower end of the outer frame 11 is bent inward to form the resting rib 112. Then, the net-shaped bottom plate 12 is inserted into the outer frame 11 and rests on the resting rib 112 of the outer frame 11. Finally, the net-shaped bottom plate 12 is combined with the resting rib 112 of the outer frame 11 by soldering to construct the basket structure 10. Thus, the upper end of the outer frame 11 is directly formed with the scratch-proof protrusion 111, and the lower end of the outer frame 11 is directly formed with the resting rib 112 whose sharp portion is bent inward, thereby preventing the basket structure 10 from scratching the user. In addition, the basket structure 10 has a simplified construction and assembly procedures, thereby decreasing the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A basket structure comprising:
an outer frame; and
a net-shaped bottom plate secured on a bottom of the outer frame;
wherein:
the outer frame includes at least one bent steel plate which is formed with at least four sides;
the at least one bent steel plate has two distal ends connected together;
the outer frame has an upper end having a periphery provided with a scratch-proof protrusion which is rounded outward;
the outer frame has a lower end having a periphery that includes the at least four sides, wherein the at least four sides comprise two long parallel sides and two short parallel sides, and at least one resting rib which is bent and extends inward provided on each of the four sides; and
the net-shaped bottom plate is received in the outer frame and rests on the at least one resting rib of the outer frame,
wherein the at least one resting rib comprises a shorter resting rib and a longer resting rib;
wherein a non-cylindrical hollow opening is located at each of four corners of the outer frame and each hollow opening is configured to separate the shorter resting rib and the longer resting rib.

2. The basket structure of claim 1, wherein the outer frame is provided with two opposite connecting brackets which are secured to the two long parallel sides or the two short parallel sides of the outer frame.

3. The basket structure of claim 2, wherein each of the two opposite connecting brackets is located under the scratch-proof protrusion.

4. The basket structure of claim 3, wherein each of the two opposite connecting brackets has a top abutting a bottom of the scratch-proof protrusion.

5. The basket structure of claim 1, wherein the net-shaped bottom plate has a bottom provided with three reinforcing projections which extend transversely along the net-shaped bottom plate.

6. The basket structure of claim 5, wherein the three reinforcing projections protrude downward from the bottom of the net-shaped bottom plate.

7. The basket structure of claim 1, wherein the outer frame and the scratch-proof protrusion are formed integrally.

8. The basket structure of claim 7, wherein the scratch proof protrusion has an end directly extending and rounded outward from the upper end of the outer frame.

9. The basket structure of claim 1, wherein the upper end of the outer frame is bent outward and directly formed with the scratch-proof protrusion.

10. The basket structure of claim 1, wherein the hollow opening of the outer frame is formed in a corner of the at least one resting rib.

* * * * *